(12) United States Patent
Rikoski et al.

(10) Patent No.: US 9,321,510 B2
(45) Date of Patent: Apr. 26, 2016

(54) SYSTEMS AND METHODS FOR DEPLOYING AUTONOMOUS UNDERWATER VEHICLES FROM A SHIP

(71) Applicant: Hadal, Inc., Oakland, CA (US)

(72) Inventors: Richard J. Rikoski, Alameda, CA (US); Robert S. Damus, Alameda, CA (US)

(73) Assignee: Hadal, Inc., Oakland, CA (US)

( * ) Notice: Subject to any disclaimer, the term of this patent is extended or adjusted under 35 U.S.C. 154(b) by 0 days.

(21) Appl. No.: 14/210,208

(22) Filed: Mar. 13, 2014

(65) Prior Publication Data

US 2014/0345511 A1    Nov. 27, 2014

Related U.S. Application Data

(60) Provisional application No. 61/792,708, filed on Mar. 15, 2013.

(51) Int. Cl.
*B63B 35/40* (2006.01)
*B22D 31/00* (2006.01)
(Continued)

(52) U.S. Cl.
CPC ............... *B63B 35/40* (2013.01); *B22D 31/00* (2013.01); *B29C 44/3415* (2013.01); *B63B 3/13* (2013.01); *B63B 27/16* (2013.01); *B63B 27/36* (2013.01); *B63G 8/00* (2013.01); *B63G 8/001* (2013.01); *B63G 8/39* (2013.01); *F17C 1/00* (2013.01);
(Continued)

(58) Field of Classification Search
CPC ...................................................... B63B 35/40
USPC ................................................. 114/259–260
See application file for complete search history.

(56) References Cited

U.S. PATENT DOCUMENTS 2,972,324 A    2/1961    Williams
3,093,105 A    6/1963    Rebikoff
(Continued)

FOREIGN PATENT DOCUMENTS

EP    0016716    10/1980
EP    0350332    1/1990
(Continued)

OTHER PUBLICATIONS

Hegrenaes, et al., "Doppler water-track aided inertial navigation for autonomous underwater vehicle", Oceans 2009, IEEE, Piscataway, NJ.

*Primary Examiner* — Lars A Olson
*Assistant Examiner* — Jovon Hayes
(74) *Attorney, Agent, or Firm* — Ropes & Gray LLP

(57) ABSTRACT

Systems and methods are described herein for launching, recovering, and handling a large number of vehicles on a ship to enable lower cost ocean survey. In one aspect, the system may include a shipping container based system with an oil services vessel. The vessel may include rolling systems through end to end shipping containers. One or more columns of containers may be accessed using a crane, an A-frame, or any other suitable transportation system. The system may enable the ability to launch or recover more than one vehicle using the launch and recovery system (e.g., AUVs, buoys, seaplanes, autonomous surface vessels, etc.). In one configuration, the system includes a stacking/elevator system to place the vehicles onto a second or higher layer of containers. The system may allow for modularized deployment of the vehicles, launch and recovery system, operation center, and more from self-contained shipping containers.

26 Claims, 5 Drawing Sheets

(51) Int. Cl.
  *F17C 1/00* (2006.01)
  *B63G 8/00* (2006.01)
  *B63G 8/39* (2006.01)
  *B29C 44/34* (2006.01)
  *B63B 3/13* (2006.01)
  *H01M 2/02* (2006.01)
  *H01M 10/052* (2010.01)
  *H01M 10/42* (2006.01)
  *B63B 27/16* (2006.01)
  *B63B 27/36* (2006.01)
  *G01S 7/52* (2006.01)
  *G01S 15/10* (2006.01)
  *G01S 15/60* (2006.01)
  *G01S 15/02* (2006.01)
  *G01S 15/58* (2006.01)
  *G01S 15/89* (2006.01)

(52) U.S. Cl.
  CPC .............. *G01S 7/52004* (2013.01); *G01S 15/02* (2013.01); *G01S 15/104* (2013.01); *G01S 15/588* (2013.01); *G01S 15/60* (2013.01); *H01M 2/024* (2013.01); *H01M 2/025* (2013.01); *H01M 10/052* (2013.01); *H01M 10/4257* (2013.01); *B63B 2027/165* (2013.01); *B63B 2035/405* (2013.01); *B63G 2008/004* (2013.01); *B63G 2008/008* (2013.01); *G01S 15/107* (2013.01); *G01S 15/8904* (2013.01); *Y10T 29/49117* (2015.01); *Y10T 29/49826* (2015.01); *Y10T 29/49893* (2015.01); *Y10T 29/5176* (2015.01); *Y10T 29/49989* (2015.01); *Y10T 428/1352* (2015.01); *Y10T 428/1376* (2015.01)

(56) References Cited

U.S. PATENT DOCUMENTS

| | | | | |
|---|---|---|---|---|
| 3,138,131 A * | 6/1964 | Szychlinski | ............ | B63B 25/20 114/321 |
| 3,536,023 A * | 10/1970 | Bascom | ................ | B63B 27/36 114/259 |
| 4,244,026 A | 1/1981 | Dickey, Jr. | | |
| 4,361,105 A * | 11/1982 | Kirby | ................ | B63B 25/006 114/260 |
| 4,488,503 A * | 12/1984 | Galatis | ................ | B63B 35/42 114/125 |
| 4,559,602 A | 12/1985 | Bates, Jr. | | |
| 4,597,352 A * | 7/1986 | Norminton | ............ | B63G 8/42 114/254 |
| 4,804,305 A * | 2/1989 | Lapotaire | ................ | E04H 6/12 104/23.1 |
| 4,898,112 A * | 2/1990 | McGlew | ............... | B63B 25/006 114/259 |
| 5,119,935 A * | 6/1992 | Stump | ....................... | B64F 1/22 206/335 |
| 5,253,605 A * | 10/1993 | Collins | ................... | B63B 21/66 114/258 |
| 5,406,901 A * | 4/1995 | Ellis | ...................... | B63B 25/004 114/72 |
| 5,458,490 A * | 10/1995 | Cabana | ................... | G09B 9/06 434/29 |
| 6,877,454 B2 * | 4/2005 | Bowen | .................. | B63B 25/004 114/259 |
| 6,966,272 B2 * | 11/2005 | Freelund | ............... | B63B 25/002 114/73 |
| 7,093,550 B2 * | 8/2006 | Williamson | .......... | B63B 25/008 114/72 |
| 7,096,811 B2 * | 8/2006 | Clarke | .................. | B63B 25/006 114/256 |
| 7,121,507 B2 * | 10/2006 | Dennis | .................. | B64C 39/024 244/110 F |
| 7,128,294 B2 * | 10/2006 | Roeseler | ............... | B64C 39/024 244/49 |
| 7,391,321 B2 * | 6/2008 | Twitchell, Jr. | ......... | B65D 90/00 340/10.1 |
| 7,581,507 B2 * | 9/2009 | Kern | ...................... | B63B 23/30 114/256 |
| 7,641,148 B2 * | 1/2010 | Zagni | ...................... | B64D 1/10 244/137.1 |
| 8,561,564 B2 * | 10/2013 | Brenner | .................... | F41F 3/08 114/238 |
| 8,739,717 B2 * | 6/2014 | Ellnor | .................... | B63B 25/00 114/61.22 |
| 8,752,494 B2 * | 6/2014 | Soreau | .................... | B63B 23/32 114/258 |
| 8,854,923 B1 | 10/2014 | Eyster | | |
| 2004/0015277 A1 | 1/2004 | Cardoza et al. | | |
| 2005/0220573 A1 * | 10/2005 | Benedict | ............... | B63B 25/004 414/143.2 |
| 2006/0164239 A1 * | 7/2006 | Loda | ................ | G06K 19/07327 340/539.22 |
| 2007/0025184 A1 | 2/2007 | Scoca et al. | | |
| 2009/0238042 A1 | 9/2009 | Hawkinson et al. | | |
| 2014/0261138 A1 | 9/2014 | Rikoski et al. | | |
| 2014/0345511 A1 * | 11/2014 | Rikoski | ................ | B22D 31/00 114/259 |

FOREIGN PATENT DOCUMENTS

| | | |
|---|---|---|
| EP | 0532096 A1 | 3/1993 |
| EP | 2469507 | 6/2012 |
| GB | 191502000 | 12/1915 |
| GB | 2164612 | 3/1986 |
| JP | 62103589 | 5/1987 |
| WO | WO-97/47990 | 12/1997 |

\* cited by examiner

SYSTEMS AND METHODS FOR DEPLOYING AUTONOMOUS UNDERWATER VEHICLES FROM A SHIP

CROSS-REFERENCE TO RELATED APPLICATIONS

This application claims the benefit of U.S. Provisional Application Ser. No. 61/792,708, filed Mar. 15, 2013, the contents of which are incorporated by reference herein in their entirety.

BACKGROUND

Ship cost dominates ocean science. Scientific ships are expensive because they are highly specialized vessels with no economies of scale. By modularizing the deployment systems for AUVs through the use of standard 40-foot shipping containers, any ordinary low cost supply vessel may be transformed into a research vessel in a matter of hours. This would increase the pool of available ships of opportunity, increase the number of possible AUVs per ship, and reduce the cost of ocean science.

SUMMARY

The present application includes systems and methods of launching, recovering, and handling a large number of vehicles on a ship to enable lower cost ocean survey. In one aspect, the system includes a shipping container based system with an oil services vessel—i.e., commodity gear. The vessel may include rolling systems through end to end shipping containers. One or more columns of containers may be accessed using a crane, A-frame, or any other suitable transportation system. The system may enable the ability to launch or recover more than one vehicle using the launch and recovery system (e.g., AUVs, buoys, seaplanes, autonomous surface vessels, etc.). In one configuration, the system includes a stacking/elevator system to place the vehicles onto a second or higher layer of containers. The system may also include operations and housing shipping containers for scientists who operation and analyze data acquired by the AUVs. The system may include one or more charging stations for batteries. The systems and methods may be configured for ejecting batteries off the side of the ship in the event of a fire (i.e. WWII depth charge style launcher). The system may include one or more deck-handling systems (for removing batteries, moving components around/between container columns, etc. . . . ). In one configuration, deck-handling software is employed to automate motion of components. The system and methods may employ modular power generation units to augment ship power system and/or to make existing systems compatible with charging large quantities of batteries and or processing. The system may include modular processing and data centers. The system may include one or more side modules with water access for dipping sensors. The system may include one or more side modules for ejection of ocean payloads such at expendable bathymetric thermographs (XBTs). The system may include the ability to deploy towed systems such as tow-sleds or towed arrays.

In certain embodiments, a system for deploying a vehicle from a vessel may comprise a vessel arranged to transport a plurality of shipping containers, wherein a vehicle is stored in at least one of the plurality of shipping containers. The vessel may include a launch and recovery system configured to launch and recover the vehicle, and a controller arranged to control operation of the launch and recovery system and receive data from the vehicle. The vessel may also include a modular power generation unit and a modular processing and data center. Finally, the vessel may include a database for storing received data from the vehicle.

The system may include a modularized deployment system wherein the launch and recovery system, controller, database, and vehicle are all stored in at least one of the plurality of shipping containers. Each of the above systems may be deployed in a modularized fashion from its respective shipping container(s). The shipping containers may be stacked into layers on the vessel. The vehicle may be stored in one or more shipping containers on the first layer, closest to the deck of the vessel, or in a second or higher layer.

The shipping containers may be aligned end-to-end to form a corridor. A rail, cart system, or similar transportation system may run through the corridor of shipping containers to connect the shipping containers to the launch and recovery system. The launch and recovery system may be able to access one or more columns of the plurality of shipping containers using a crane, a knuckleboom, an A-frame, or any suitable transportation system. The vehicle may be stored in, or transported to, the shipping container at the end of the corridor of shipping containers and rolled through the column in order to reach the launch and recovery system.

The launch and recovery system may deploy the vehicle in any suitable manner. For example, for an AUV, the launch and recovery system may comprise a crane for lowering the AUV into the water or a torpedo mechanism for shooting the AUV through the air/water. For an unmanned aerial vehicle (UAV), the launch and recovery system may comprise a runway and/ or a catapult system. The vehicle may also be a remotely operated vehicle (ROV), a buoy, a seaplane, an autonomous surface vessel, a towed sled, a towed array, an exploratory robot, or any other deployable vehicle. The vessel may be any vessel or boat suitable for carrying one or more shipping containers, such as an oil services vessel, an oil supply vessel, a fishing boat, a military vessel, or a science vessel.

Other objects, features, and advantages of the present invention will become apparent upon examining the following detailed description, taken in conjunction with the attached drawings.

BRIEF DESCRIPTION OF THE FIGURES

The systems and methods described herein are set forth in the appended claims. However, for purpose of explanation, several illustrative embodiments are set forth in the following figures.

DETAILED DESCRIPTION

Figure 1:
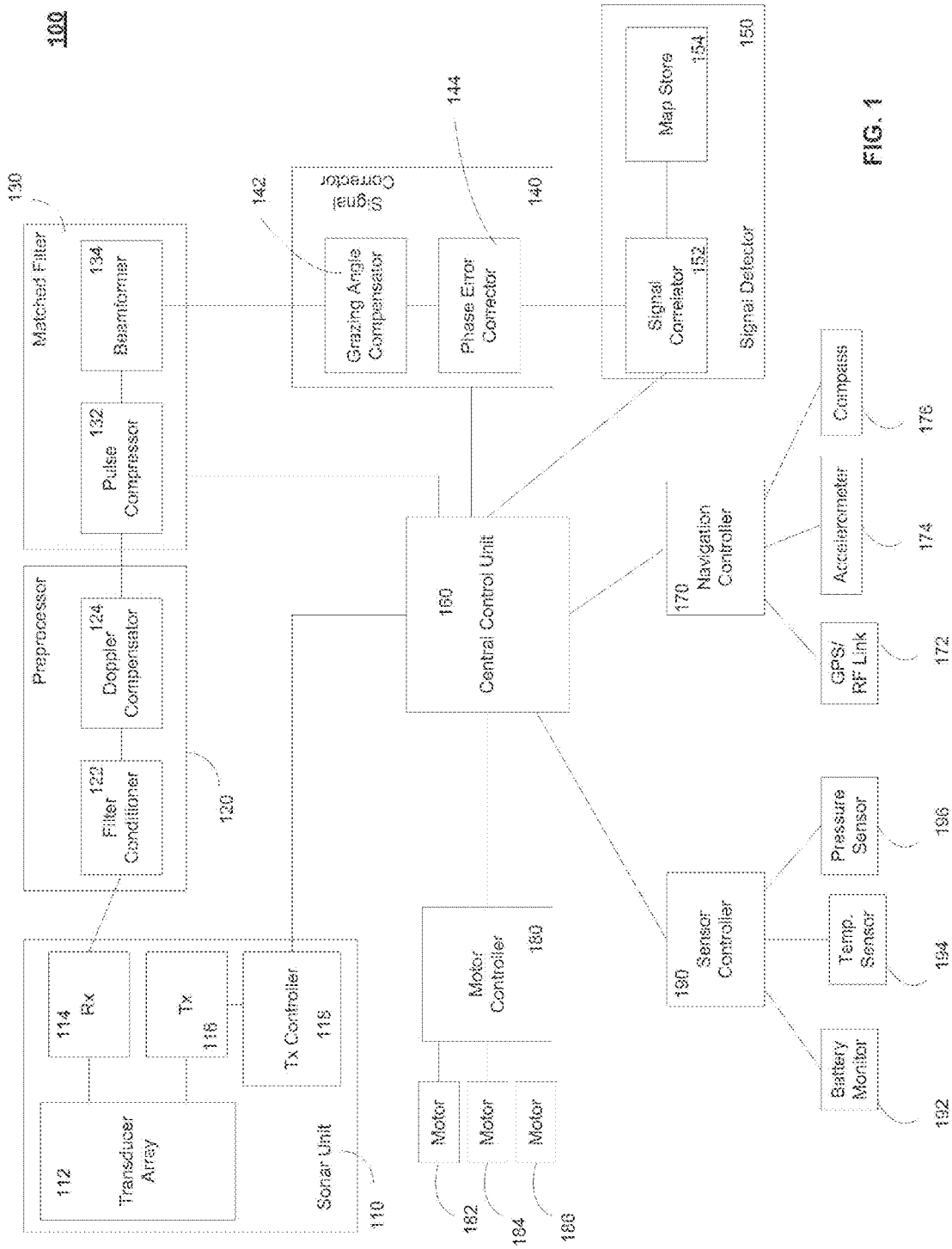
FIG. 1 is a block diagram depicting an illustrative remote vehicle, according to an illustrative embodiment of the present disclosure.

To provide an overall understanding of the invention, certain illustrative embodiments will now be described. However, it will be understood by one or ordinary skill in the art that the systems and methods described herein can be adapted and modified for other suitable applications and that such other additions and modifications will not depart from the scope hereof.

The present application includes systems and methods of launching, recovering, and handling a large number of vehicles on a vessel to enable lower cost ocean survey. In one aspect, the system includes a process and systems to acquire a suitable vessel, such as an offshore supply vessel, place standard 40 foot shipping containers on its aft deck, and then deploy, operate, and/or recovery the AUVs. This advantageously allows operations to scale from 2 to 15 vehicles or more, while dropping the cost per square kilometer for mapping from about $280 to approximately $50. In one instance, the ship or vessel is expected to cost about $4-6 million and would not be refitted.

An offshore supply vessel is the nautical equivalent of a flatbed truck. Designed to deliver arbitrary equipment to oil rigs, it features a large flat aft deck with no obstructions around the stern. In one embodiment, the vessel has an aft deck which is 202'×56'. Any suitable vessel for transporting shipping containers may be used, including an oil services vessel, an oil supply vessel, a fishing boat, a military vessel, or a science vessel.

A typical oceanographic research vessel can cost about $50,000 per day. A supply vessel employing a shipping container-based deployment system can cost roughly $30,000 per day. The typical research vessel can carry a maximum of two AUVs. With two vehicles, the research vessel's ship cost per robot day is approximately $25,000. A supply ship with 15 vehicles would have a ship cost per robot day closer to $2000.

TABLE 1

Ship cost per robot day vs. Number of Vehicles per Ship

| Vehicles per Ship | 2 | 5 | 10 | 15 |
|---|---|---|---|---|
| Ship cost/robot day (research vessel) | $25,000 | | | |
| Ship cost/robot day (300 ft. supply vessel) | $15,000 | $6,000 | $3,000 | $2,000 |

In one embodiment, the ship or vessel would initially be outfitted with two vehicles, with the potential to scale up to 15 vehicles as they were built. In some embodiments, to minimize export compliance restrictions the vessel may be a US flagged vessel and manned with a US crew. To avoid Jones act tariffs, certain embodiments will avoid modifying the ship or vessel in particular ways. Any desired additional systems and spaces may be addressed by stacking additional properly outfitted shipping containers on the aft deck. The ship may have a short service life (5 years) and then be sold or scrapped. Illustrative specifications for an exemplary vessel and two alternative vessels can be seen below in Table 2.

TABLE 2

Illustrative Specifications for an Exemplary Vessel and Two Alternative Vessels

| | Exemplary Vessel | Alternative Vessel 1 | Alternative Vessel 2 |
|---|---|---|---|
| Price | $5.75M | $4.125M | $2.588M |
| Deck | 202' × 56' 6" | 150' × 30' | 158' × 29' |
| Year | 1976 | 1979 | 1984 |

TABLE 2-continued

Illustrative Specifications for an Exemplary Vessel and Two Alternative Vessels

| | Exemplary Vessel | Alternative Vessel 1 | Alternative Vessel 2 |
|---|---|---|---|
| AUV Capacity | 15 | 6 | 6 |

Vehicles would be stored in shipping containers. The vehicles may comprise buoys that can be deployed from 20 or 40 foot shipping containers. Submersibles, ROVs, seaplanes, and other remote or manned vehicles may be stored and deployed from the shipping containers. The containers may be aligned end-to-end or may be stacked on top of each other. The vehicles may be rolled directly through the shipping containers on rollers. With gaps, three 40 foot shipping containers placed end to end could create a corridor of roughly 130 feet. The gap between shipping containers may be a predetermined distance to allow access to each of the shipping containers including opening the doors. A launch and recovery system may be placed at the outlet of the corridor. The launch and recovery system may comprise a crane, multiple cranes, a stern ramp, a catapult, a runway, a torpedo-based system, a cannon, a rocket-based launch system, or any other suitable launch and recovery system or combination thereof. Vehicles may be rolled out of the containers using a rail system through a corridor of shipping containers and onto the launch and recovery system to be deployed. The rail system may comprise a typical rail system and may include a transportation cart. Recovery may comprise a reverse process as deployment or any other suitable recovery system, such as a crane capture or a net capture system.

In some embodiments, the vessel may comprise a crane, A-frame, or any other suitable transportation system for accessing one or more shipping containers. The transportation system may be able to access one or more stacked shipping containers. In some embodiments, the transportation system may connect the plurality of shipping containers with two or more launch and recovery systems. In some embodiments, the shipping containers may be arranged end-to-end into corridors, and the number of corridors may outnumber the number of launch and recovery systems. In such embodiments, the transport system may provide a shuffling mechanism configured to connect each launch and recovery system with each of the different corridors of shipping containers. For example, a transportation system comprising a rail system may connect each launch and recovery system with a particular corridor of shipping containers, and each rail may be able to slide on the deck of the vessel to switch each launch and recovery system to a different corridor of shipping containers. The transportation system may also include a mobile system, such as a movable crane, that can move freely across the deck of the ship. In some embodiments, the transportation system may comprise a portion of the launch and recovery system. For example, the vessel may include a single crane that can serve as both the launch and recovery system and the transportation system.

In some embodiments, the vessel may include a battery charging station, an operations van, modular power generation units, modular processing and data center, a database for storing received data from the vehicle, and housing shipping containers for scientists. All of these systems may be deployed from shipping containers, and all could easily moved to another vessel. The battery charging station may comprise suitable systems for charging batteries for the multiple vehicles on the ship, such as lithium-ion batteries, lithium-polymer batteries, lithium-sulfur batteries, nickel metal hydride batteries, silver-zinc, or any other suitable chemistry. The battery charging station may include additional backup cells that may be switched out for failed cells on any of the vehicles. The battery charging station may be hooked into the power generation unit of the main vessel. The battery charging station may optionally include a refueling station for the vessel engines or fuel cells. Similarly, the modular power generation unit may be used to augment the vessel's power system. The modular power generation unit may comprise a fossil fuels-based system, a nuclear power generator, a solar panel, a gas turbine, or any other suitable power generation system. The database for storing received data from the vehicle(s) may comprise a typical computer system or a specialized database for processing data from the vehicle(s). The database may be deployed as part of, or separate from, the modular processing and data center. As an illustrative embodiment, the database and/or modular processing data center may comprise a typical computing system running a Windows operating system, or any other suitable operating system for analyzing data received from the vehicle.

In this manner, the plurality of shipping containers may comprise a research "kit" that may shipped by rail, truck, container ship, cargo plane, or any other delivery method to any ship or vessel with suitable deck space. Thus, an ordinary shipping vessel, such as an oil services vessel or a fishing vessel, may be converted into a research vessel in a matter of hours.

FIG. 1 is a block diagram depicting an illustrative remote vehicle, according to an illustrative embodiment of the present disclosure. The system 100 includes a sonar unit 110 for sending and receiving sonar signals, a preprocessor 120 for conditioning a received (or reflected) signal, and a matched filter 130 for performing pulse compression and beamforming. The system 100 is configured to allow for navigating using high-frequency (greater than about 100 kHz) sonar signals. To allow for such HF navigation, the system 100 includes a signal corrector 140 for compensating for grazing angle error and for correcting phase error. The system 100 also includes a signal detector 150 for coherently correlating a received image with a map. In some embodiments, the system 100 includes an on-board navigation controller 170, motor controller 180 and sensor controller 190. The navigation controller 170 may be configured to receive navigational parameters from a GPS/RF link 172 (when available), an accelerometer 174, a gyroscope, and a compass 176. The motor controller 180 may be configured to control a plurality of motors 182, 184 and 186 for steering the vehicle. The sensor controller 190 may receive measurements from the battery monitor 172, a temperature sensor 194 and a pressure sensor 196. The system 100 further includes a central control unit (CCU) 160 that may serve as a hub for determining navigational parameters based on sonar measurements and other navigational and sensor parameters, and for controlling the movement of the vehicle.

In the context of a surface or underwater vehicle, the CCU 160 may determine navigational parameters such as position (latitude and longitude), velocity (in any direction), bearing, heading, acceleration and altitude. The CCU 160 may use these navigational parameters for controlling motion along the alongtrack direction (fore and aft), acrosstrack direction (port and starboard), and vertical direction (up and down). The CCU 160 may use these navigational parameters for controlling motion to yaw, pitch, roll or otherwise rotate the vehicle. During underwater operation, a vehicle such as an AUV may receive high-frequency real aperture sonar images or signals at sonar unit 110, which may then be processed, filtered, corrected, and correlated against a synthetic aperture sonar (SAS) map of the terrain. Using the correlation, the CCU may then determine the AUV's position, with high-precision and other navigational parameters to assist with navigating the terrain. The precision may be determined by the signal and spatial bandwidth of the SAS map and/or the acquired sonar image. In certain embodiments, assuming there is at least a near perfect overlap of the sonar image with a prior SAS map with square pixels, and assuming that the reacquisition was performed with a single channel having a similar element size and bandwidth, and assuming little or no losses to grazing angle compensation, the envelope would be about one-half the element size. Consequently, in certain embodiments, the peak of the envelope may be identified with high-precision, including down to the order of about $1/100^{th}$ of the wavelength. For example, the resolution may be less than 2.5 cm, or less than 1 cm or less than and about 0.1 mm in the range direction.

Generally, terrain recognition using long wavelength (low-frequency) sensors may be difficult due to the aspect dependence of object signatures. Sonar or radar images may be dominated by speckle that change with both sonar and object aspect, making incoherent image correlation extremely difficult. Coherently, any correlation operation involving signals with non-overlapping frequency bands will yield an answer of zero (since correlation is multiplication in the frequency domain). For two sonar images to correlate it is not enough that their spatial frequencies overlap, but the same points in the two images must be represented at overlapping frequencies. For a generic real aperture sonar, the same signature for a complex scene can only typically be re-observed by revisiting the original observation position and orientation and using the same frequencies. Consequently, in general, getting two complex sonar or radar images to coherently correlate is a measure zero occurrence; the expected cross correlation can be proven to be approaching zero. Incoherent navigation is possible (i.e. using only the envelope) if there is distinct terrain, but against a uniform bottom (mud flat, field of gravel, ocean floor, etc.) this is usually not so.

Holographic navigation of a terrain, e.g., using a system implemented on AUVs, solves this problem by replacing at least one of the real aperture images with a synthetic aperture image. Because a synthetic aperture image is a type of hologram (or quasi-hologram) it contains all possible real aperture images over some range of frequencies and angles. Consequently, it may be possible to correlate a real aperture image against the synthetic aperture image and have a non-zero expected cross correlation. However, according to the Closed/Open Aperture theorem, it may be required that the synthetic aperture be a planar synthetic aperture, meaning that it is fully populated and Nyquist sampled in two dimensions. This type of population and sampling frequency is, in general, impractical.

By assuming the terrain is a manifold with embedded scatterers on the surface, and avoiding sub-bottom profiles/operating above the critical angle, or operating below the critical angle where the SNR is low, it is possible to show that the planar aperture can be replaced with a contour aperture provided the frequencies can rescaled. For example, consider an active sonar or radar and two scatterers spaced 5 centimeters apart in range on a flat bottom. From the perspective of a sonar or radar looking at the scatterers from the ground, the distance of travel for the two echoes differ by 10 cm (out and back). If the observer is, instead, looking down at an angle of 45 degrees above horizontal, the difference is shorted by cosine of 45 degrees (half) to 7.07 cm. So at horizontal a 10 cm wavelength would be exactly one cycle out of phase (constructively interferes), and a 20 centimeter wavelength would be exactly a half cycle out of phase (destructively interfere). At 45 degrees, the same would be true of a 7.07 cm wavelength and a 14.14 cm wavelength. Both wavelengths are scaled by the same amount (and, similarly, so are frequencies, except inversely). More generally, a change in vertical angle shifts all frequencies and changes the signal length by the cosine of the angle. This is not a shift in frequency so much as a change in pitch, where a doubling in frequency corresponds to a change in pitch of one octave. So by changing the observation angle from horizontal to looking down at 60 degrees the expected return is shorted by half and increases in pitch by one octave. In order for this to work, it is necessary for the second observation to be made with appropriately scaled frequencies relative to the first; for a very narrowband system too much of a change in grazing angle simply leads to the known signatures being out of band.

In some embodiments, using grazing angle compensation and a prior synthetic aperture image of the systems and methods described herein, it is possible to navigate relative to terrain using a single element sonar or radar. Although synthetic aperture systems are extremely expensive, single element systems are generally very cheap. This means a very expensive mapping system can enable the widespread use of cheap autonomous systems with minimal inertial navigation. However, successful holographic navigation implementations to date have all used low frequency sonars (i.e. under 50 kHz), while the higher frequency systems have not worked. This is unfortunate, because lower frequency transmitters are, in general, larger, higher power, and more expensive. Thus, it is desirable to have a high frequency single element holographic navigation system. Further illustrative embodiments of holographic navigation systems and methods are disclosed in U.S. patent application Ser. Nos. 12/802,453, 12/454,486, 12/454,484, and 12/454,885, the contents of each of which are incorporated herein by reference in their entirety.

As noted above, the system 100 includes a sonar unit 110 for transmitting and receiving acoustic signals. The sonar unit includes a transducer array 112 having a one or more transmitting elements or projectors and a plurality of receiving elements arranged in a row. In certain embodiments the transducer array 112 includes separate projectors and receivers. The transducer array 112 may be configured to operate in SAS mode (either stripmap or spotlight mode) or in a real aperture mode. In certain embodiments, the transducer array 112 is configured to operate as a multibeam echo sounder, sidescan sonar or sectorscan sonar. The transmitting elements and receiving elements may be sized and shaped as desired and may be arranged in any configuration, and with any spacing as desired without departing from the scope of the present disclosure. The number, size, arrangement and operation of the transducer array 112 may be selected and controlled to insonify terrain and generate high-resolution images of a terrain or object. One example of an array 112 includes a 16 channel array with 5 cm elements mounted in a 12¾ inch vehicle.

The sonar unit 110 further includes a receiver 114 for receiving and processing electrical signals received from the transducer, and a transmitter 116 for sending electrical signals to the transducer. The sonar unit 110 further includes a transmitter controller 118 for controlling the operation of the transmitter including the start and stop, and the frequency of a ping.

The signals received by the receiver 114 are sent to a preprocessor for conditioning and compensation. Specifically, the preprocessor 120 includes a filter conditioner 122 for eliminating outlier values and for estimating and compensating for hydrophone variations. The preprocessor further includes a Doppler compensator 124 for estimating and compensating for the motion of the vehicle. The preprocessed signals are sent to a matched filter 130.

The matched filter 130 includes a pulse compressor 132 for performing matched filtering in range, and a beamformer 134 for performing matched filtering in azimuth and thereby perform direction estimation.

The signal corrector 140 includes a grazing angle compensator 142 for adjusting sonar images to compensate for differences in grazing angle. Typically, if a sonar images a collection of point scatterers the image varies with observation angle. For example, a SAS system operating at a fixed altitude and heading observing a sea floor path will produce different images at different ranges. Similarly, SAS images made at a fixed horizontal range would change if altitude were varied. In such cases, changes in the image would be due to changes in the grazing angle. The grazing angle compensator 142 is configured to generate grazing angle invariant images. One such grazing angle compensator is described in U.S. patent application Ser. No. 12/802,454 titled "Apparatus and Method for Grazing Angle Independent Signal Detection," the contents of which are incorporated herein by reference in their entirety.

The signal corrector 140 includes a phase error corrector 144 for correcting range varying phase errors. Generally, the phase error corrector 144 breaks the image up into smaller pieces, each piece having a substantially constant phase error. Then, the phase error may be estimated and corrected for each of the smaller pieces.

The system 100 further includes a signal detector 150 having a signal correlator 152 and a storage 154. The signal detector 150 may be configured to detect potential targets, estimate the position and velocity of a detected object and perform target or pattern recognition. In one embodiment, the storage 154 may include a map store, which may contain one or more previously obtained SAS images real aperture images or any other suitable sonar image. The signal correlator 152 may be configured to compare the received and processed image obtained from the signal corrector 140 with one or more prior images from the map store 154.

The system 100 may include other components, not illustrated, without departing from the scope of the present disclosure. For example, the system 100 may include a data logging and storage engine. In certain embodiments the data logging and storage engine may be used to store scientific data which may then be used in post-processing for assisting with navigation. The system 100 may include a security engine for controlling access to and for authorizing the use of one or more features of system 100. The security engine may be configured with suitable encryption protocols and/or security keys and/or dongles for controlling access. For example, the security engine may be used to protect one or more maps stored in the map store 154. Access to one or more maps in the map store 154 may be limited to certain individuals or entities having appropriate licenses, authorizations or clearances. Security engine may selectively allow these individuals or entities access to one or more maps once it has confirmed that these individuals or entities are authorized. The security engine may be configured to control access to other components of system 100 including, but not limited to, navigation controller 170, motor controller 180, sensor controller 190, transmitter controller 118, and CCU 160.

Figure 2:
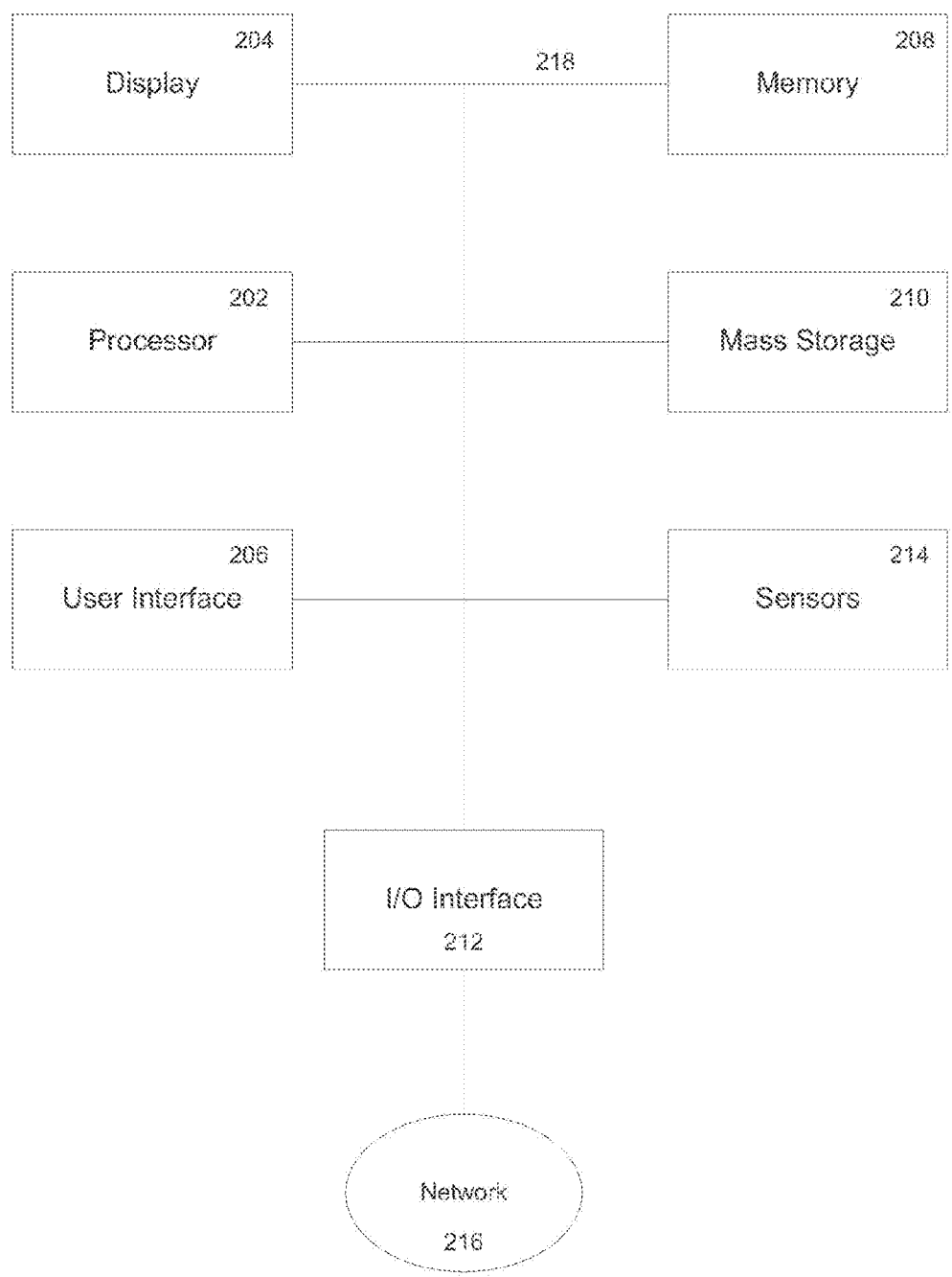
FIG. 2 is block diagram of an exemplary computer system for implementing at least a portion of the systems and methods described in the present disclosure.

Generally, with the exception of the transducer 112, the various components of system 100 may be implemented in a computer system, such as computer system 200 of FIG. 2.

More particularly, FIG. 2 is a functional block diagram of a general purpose computer accessing a network according to an illustrative embodiment of the present disclosure. The holographic navigation systems and methods described in this application may be implemented using the system 200 of FIG. 2. In certain configurations, control of the operation of the launch and recovery system described herein may be implemented using a computer system such as system 200. The system 200 may receive data from a launched vessel or vehicle (e.g., vehicle 414) and process the data. The system 200 may interface with a database that stores received data from the vehicle and/or stores processed data. The system 200 may be included in a controller that controls the launch and recovery components. The system 200 may be located locally on the vessel performing launch and recovery, or located remotely from the vessel at, for example, a land based location that sends instructions and receives data from the vessel. The database may be located locally on the vessel or located remotely from the vessel such as, for example, at a remote land based location. The controller may receive, without limitation, vessel location information, information from a launched vehicle, manual instructions from a user, and other data.

The exemplary system 200 includes a processor 202, a memory 208, and an interconnect bus 218. The processor 202 may include a single microprocessor or a plurality of microprocessors for configuring computer system 200 as a multi-processor system. The memory 208 illustratively includes a main memory and a read-only memory. The system 200 also includes the mass storage device 210 having, for example, various disk drives, tape drives, etc. The main memory 208 also includes dynamic random access memory (DRAM) and high-speed cache memory. In operation and use, the main memory 208 stores at least portions of instructions for execution by the processor 202 when processing data (e.g., model of the terrain) stored in main memory 208.

In some embodiments, the system 200 may also include one or more input/output interfaces for communications, shown by way of example, as interface 212 for data communications via the network 216. The data interface 212 may be a modem, an Ethernet card or any other suitable data communications device. The data interface 212 may provide a relatively high-speed link to a network 216, such as an intranet, internet, or the Internet, either directly or through another external interface. The communication link to the network 216 may be, for example, any suitable link such as an optical, wired, or wireless (e.g., via satellite or 802.11 Wi-Fi or cellular network) link. In some embodiments, communications may occur over an acoustic modem. For instance, for AUVs, communications may occur over such a modem. Alternatively, the system 200 may include a mainframe or other type of host computer system capable of web-based communications via the network 216.

In some embodiments, the system 200 also includes suitable input/output ports or may use the Interconnect Bus 218 for interconnection with a local display 204 and user interface 206 (e.g., keyboard, mouse, touchscreen) or the like serving as a local user interface for programming and/or data entry, retrieval, or manipulation purposes. Alternatively, server operations personnel may interact with the system 200 for controlling and/or programming the system from remote terminal devices (not shown in the Figure) via the network 216.

In some embodiments, a system requires a processor, such as a navigational controller 170, coupled to one or more coherent sensors (e.g., a sonar, radar, optical antenna, etc.) 214. Data corresponding to a model of the terrain and/or data corresponding to a holographic map associated with the model may be stored in the memory 208 or mass storage 210, and may be retrieved by the processor 202. Processor 202 may execute instructions stored in these memory devices to perform any of the methods described in this application, e.g., grazing angle compensation, or high frequency holographic navigation.

The system may include a display 204 for displaying information, a memory 208 (e.g., ROM, RAM, flash, etc.) for storing at least a portion of the aforementioned data, and a mass storage device 210 (e.g., solid-state drive) for storing at least a portion of the aforementioned data. Any set of the aforementioned components may be coupled to a network 216 via an input/output (I/O) interface 212. Each of the aforementioned components may communicate via interconnect bus 218.

In some embodiments, the system requires a processor coupled to one or more coherent sensors (e.g., a sonar, radar, optical antenna, etc.) 214. The sensor array 214 may include, among other components, a transmitter, receive array, a receive element, and/or a virtual array with an associated phase center/virtual element.

Data corresponding to a model of the terrain, data corresponding to a holographic map associated with the model, and a process for grazing angle compensation may be performed by a processor 202. The system may include a display 204 for displaying information, a memory 208 (e.g., ROM, RAM, flash, etc.) for storing at least a portion of the aforementioned data, and a mass storage device 210 (e.g., solid-state drive) for storing at least a portion of the aforementioned data. Any set of the aforementioned components may be coupled to a network 216 via an input/output (I/O) interface 212. Each of the aforementioned components may communicate via interconnect bus 218.

In operation, a processor 202 receives a position estimate for the sensor(s) 214, a waveform or image from the sensor(s) 214, and data corresponding to a model of the terrain, e.g., the sea floor. In some embodiments, such a position estimate may not be received and the process performed by processor 202 continues without this information. Optionally, the processor 202 may receive navigational information and/or altitude information, and a processor 202 may perform a coherent image rotation algorithm. The output from the system processor 202 includes the position to which the vehicle needs to move to.

The components contained in the system 200 are those typically found in general purpose computer systems used as servers, workstations, personal computers, network terminals, portable devices, and the like. In fact, these components are intended to represent a broad category of such computer components that are well known in the art.

It will be apparent to those of ordinary skill in the art that methods involved in the systems and methods of the invention may be embodied in a computer program product that includes a non-transitory computer usable and/or readable medium. For example, such a computer usable medium may consist of a read only memory device, such as a CD ROM disk, conventional ROM devices, or a random access memory, a hard drive device or a computer diskette, a flash memory, a DVD, or any like digital memory medium, having a computer readable program code stored thereon.

Optionally, the system may include an inertial navigation system, a Doppler sensor, an altimeter, a gimbling system to fixate the sensor on a populated portion of a holographic map, a global positioning system (GPS), a long baseline (LBL) navigation system, an ultrashort baseline (USBL) navigation, or any other suitable navigation system.

Figure 3:
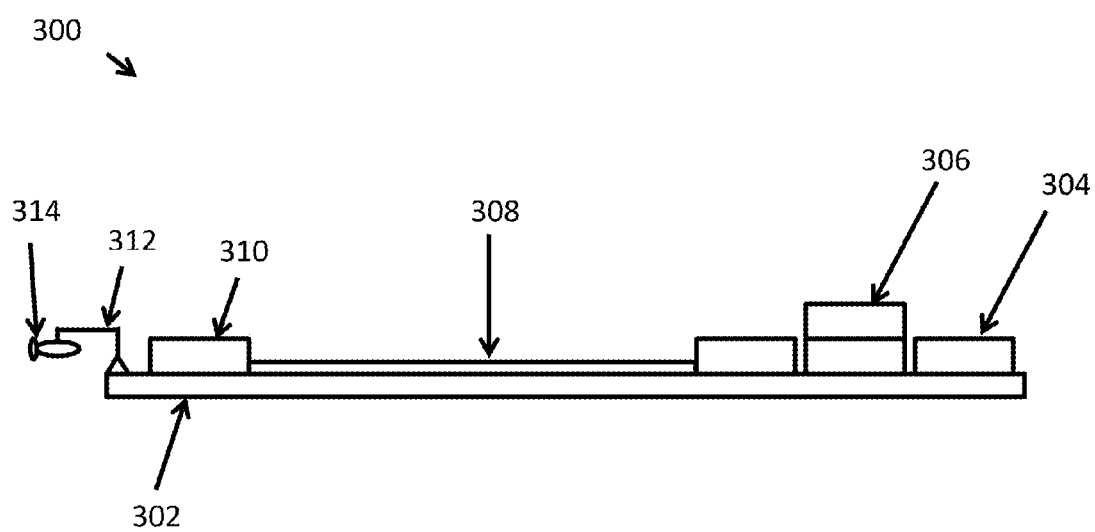
FIG. 3 depicts a side view of an illustrative example of a vessel including a shipping container-based deployment system.

FIG. 3 depicts a side view of an illustrative example of a vessel 300 including a shipping container-based deployment system. The vessel 300 includes a deck 302, a plurality of shipping containers 304 and 306, wherein shipping container 306 may be stacked on top of one or more other shipping containers 304, transportation system 308, data processing center 310, launch and recovery system 312, and vehicle 314.

The shipping containers 304 and 306 may comprise any suitable storage containers, such as standard 20 or 40 ft. shipping containers. Although the shipping containers 304 and 306 shown in FIG. 3 are arranged in rows on one side of the deck 302, the shipping containers 304 and 306 may be arranged in any suitable arrangement. The shipping container 306 may be placed on top of one or more of the plurality of shipping containers 304.

The shipping containers 304 and 306 may be aligned end-to-end to form a corridor. The transportation system 308 may comprise a rail, a cart system, or similar transportation system or any combination thereof. The transportation system 308 may run through one or more corridors of shipping containers to connect the corridors to the launch and recovery system 312. The transportation system 308 and/or the launch and recovery system 312 may be able to access one or more columns of the plurality of shipping containers 304 and 306 using a crane, a knuckleboom, an A-frame, or any other suitable transportation system. The vehicle 314 may rolled through the column of shipping containers in order to reach the launch and recovery system 312.

Data processing center 310 may include a database for storing received data from the vehicle 314. Data processing center 310 may comprise a computer system, such as computer system 200 of FIG. 2 or one or more personal computers that run the Windows operating system, or any other suitable operating system for analyzing data received from the vehicle. The data processing center 310 may be completely contained within, or deployable from, one or more shipping containers. The one or more shipping containers including the data processing center 310 may be included with shipping containers 304 and 306. In some configurations, the data processing center 310 may be located remotely from the vessel 300 while being in continuous or periodic communication with the launch and recovery system 312 on the vessel 300.

The launch and recovery system 312 may be able to access one or more columns of the plurality of shipping containers 304 and 306 using a crane, a knuckleboom, an A-frame, or any suitable transportation system. The launch and recovery system 312 may be included in or comprise the transportation system 308. The launch and recover system 312 may be stored in and deployed from one or more of the shipping containers 304 and 306. The launch and recovery system 312 may comprise a crane, multiple cranes, a catapult, a runway, a torpedo-based system, a cannon, a rocket-based launch system, or any other suitable launch and recovery system or combination thereof. Recovery may comprise a reverse process as deployment or any other suitable recovery system, such as a crane capture or a net capture system.

In certain configurations, the data processing center 310 includes a controller arranged to control the operation of the launch and recovery system 312. The controller may include programming to enable automatic deployment and recovery of a vehicle 314. The controller may receive terrestrial location information (e.g., GPS, inertial navigation, and the like) and, based on the location of the vessel, control the deployment of one or more vehicles 314 from the vessel 300. The controller may deploy a plurality of vehicles based on a programmed table or grid of locations to affect a survey of an area of a body of water. The controller may be arranged to periodically deploy and/or retrieve vehicles. The controller may be arranged to deploy and/or retrieve vehicles in response to a manual input from a user. The controller programming may be automatically or manually updated via a communications interface with a remote programming source. Hence, the software and/or programming of the controller may be updated as needed to update a deployment and/or retrieval schedule of vehicles.

The vehicle 314 may also be an AUV, UAV, a remotely operated vehicle (ROV), a buoy, a seaplane, an autonomous surface vessel, an exploratory robot, or any other deployable vehicle. The vehicle 314 may be stored in and deployed from one or more of the shipping containers 304 and 306.

The vehicle 314 may be deployed, for example, to gather survey data to map an area of the ocean floor. By deploying a plurality of vehicles periodically as the vessel 300 traverses an portion of a body of water, each vehicle 300 can efficiently survey an area of the body of water so as to from a map of an area of the body of water. The survey data may be processed by the data processing center 310 into, for example, maps of the floor of a body of water. Some or all of the survey data retrieved from a vehicle 314 may be transmitted from the data processing center 310 to a remote location for further processing. Some or all of the survey data may be processed by a processor on the vehicle 314 prior to transmission to the data processing center 310.

Figure 4:
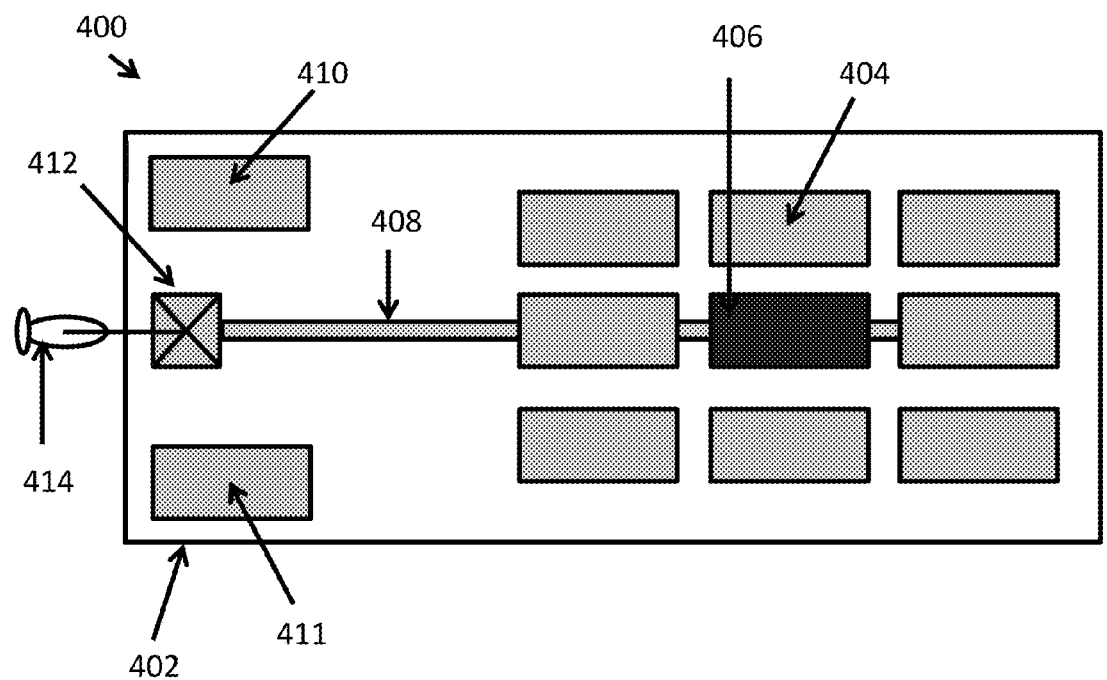
FIG. 4 depicts a top view of an illustrative example of a vessel including a shipping container-based deployment system.

FIG. 4 depicts a top view of an illustrative example of a vessel including a shipping container-based deployment system. The vessel 400 includes a deck 402, a plurality of shipping containers 404 and 406, wherein shipping container 406 may be stacked on top of one or more other shipping containers 404, transportation system 408, data processing center 410, modular data generation unit 411, launch and recovery system 412, and vehicle 414.

The shipping containers 404 and 406 may comprise any suitable storage containers, such as standard 20 or 40 ft. shipping containers. Although the shipping containers 404 and 406 shown in FIG. 4 are arranged in a 3×3 matrix on one side of the deck 402, the shipping containers 404 and 406 may be arranged in any suitable arrangement. The shipping container 406 may be placed on top of one or more of the plurality of shipping containers 404.

The shipping containers 404 and 406 may be aligned end-to-end to form a corridor. The transportation system 408 may comprise a rail, a cart system, or similar transportation system or any combination thereof. The transportation system 408 may run through one or more corridors of shipping containers to connect the corridors to the launch and recovery system 412. The transportation system 108 and/or the launch and recovery system 412 may be able to access one or more columns of the plurality of shipping containers 404 and 406 using a crane, a knuckleboom, an A-frame, or any other suitable transportation system. The vehicle 414 may rolled through the column of shipping containers in order to reach the launch and recovery system 412.

Data processing center 410 may include a database for storing received data from the vehicle 414. Data processing center 410 may comprise a computer system, such as computer system 200 of FIG. 2 or one or more personal computers that run the Windows operating system, or any other suitable operating system for analyzing data received from the vehicle. The data processing center 410 may be completely contained within, or deployable from, one or more shipping containers. The one or more shipping containers including the data processing center 410 may be included with shipping containers 404 and 406.

The modular power generation unit 411 may be used to augment the vessel's power system. The modular power generation unit 411 may comprise a fossil fuels-based system, a nuclear power generator, a solar panel, a gas turbine, or any other suitable power generation system.

The launch and recovery system 412 may be able to access one or more columns of the plurality of shipping containers 404 and 406 using a crane, a knuckleboom, an A-frame, or any suitable transportation system. The launch and recovery system 412 may be included in or comprise the transportation system 408. The launch and recover system 412 may be stored in and deployed from one or more of the shipping containers 404 and 406. The launch and recovery system 412 may comprise a crane, multiple cranes, a catapult, a runway, a torpedo-based system, a cannon, a rocket-based launch system, or any other suitable launch and recovery system or combination thereof. Recovery may comprise a reverse process as deployment or any other suitable recovery system, such as a crane capture or a net capture system.

The vehicle 414 may also be an AUV, UAV, a remotely operated vehicle (ROV), a buoy, a seaplane, an autonomous surface vessel, an exploratory robot, a towed array, a tow sled, or any other deployable vehicle. The vehicle 414 may be stored in and deployed from one or more of the shipping containers 404 and 406.

Figure 5:
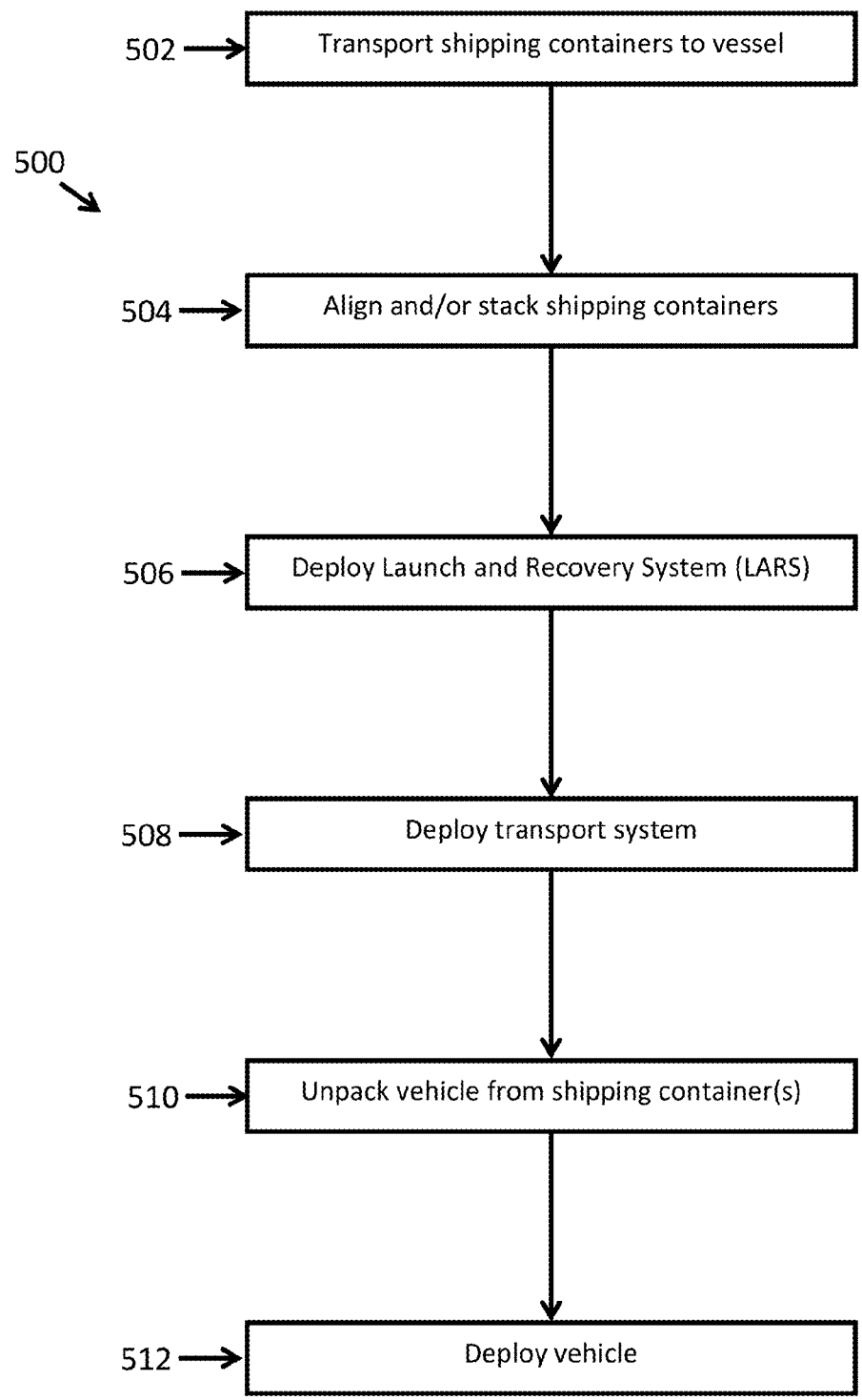
FIG. 5 depicts a process for deploying a vehicle from a vessel using a shipping container-based deployment system.

FIG. 5 depicts a process 500 for deploying a vehicle from a vessel using a shipping container-based deployment system. The process 500 includes transporting shipping containers to a vessel at step 502, aligning and/or stacking shipping containers at step 504, deploying a launch and recovery system at step 506, deploying the transport system at step 508, unpacking a vehicle from one or more shipping containers at step 510, and deploying the vehicle at step 512.

At step 502, a plurality of shipping containers may be transported to a suitable vessel, such as oil services vessel, an oil supply vessel, a fishing boat, a military vessel, or a science vessel. Suitable delivery methods for the shipping containers include cargo plane, truck, rail, or ship. The shipping containers may contain modular systems for deploying a vehicle from a vessel. For example, the shipping containers may contain one or more deployable vehicles, a launch and recovery system, a transportation system, a data processing center, battery charging station, or a modular power generation unit.

At step 504, the shipping containers may be aligned and/or stacked on top of each other on the deck of the vessel. As an illustrative example, the shipping containers may be aligned in a 3×3 matrix, as shown in FIG. 4. The shipping containers may be placed with a predetermined minimum spacing to allow access to each of the shipping containers. Shipping containers with contents that need to be accessed with high frequency may be stored closest to the deck, while shipping containers with contents that can be accessed with a lower frequency may be stacked on a second or higher level. For example, once a deployable vehicle is unpacked from one or more of the shipping containers, the empty shipping containers may be stacked on top of other shipping containers.

At step 506, the launch and recovery system may be deployed from one or more shipping containers. The launch and recovery system may comprise a modular system that can be assembled on the deck of the vessel. At step 508, the transport system may be deployed from one or more of the shipping containers. The transport system may connect one or more of the shipping containers to the launch and recovery system. As an illustrative example, the transport system may comprise a rail and cart system configured to move a deployable vehicle from the shipping containers to the launch and recovery system. The transport system may be able to move freely over the deck of the vessel and between columns and rows of shipping containers.

At step 510, a vehicle may be unpacked from one or more of the shipping containers. At step 512, the vehicle may be deployed on the deck of the ship. Deploying the vehicle may comprise assembling the vehicle on the deck of the ship. Deploying the vehicle may also comprise launching the vehicle using the launch and recovery system.

It will be apparent to those skilled in the art that such embodiments are provided by way of example only. It should be understood that numerous variations, alternatives, changes, and substitutions may be employed by those skilled in the art in practicing the invention. Accordingly, it will be understood that the invention is not to be limited to the embodiments disclosed herein, but is to be understood from the following claims, which are to be interpreted as broadly as allowed under the law.

What is claimed is:

1. A system for deploying a vehicle from a vessel, comprising:
    a plurality of shipping containers, wherein the plurality of shipping containers store at least a vehicle and a launch and recovery system configured to launch and recover the vehicle;
    a vessel arranged to transport the plurality of shipping containers; and
    a controller arranged to:
        control the operation of the launch and recovery system; and
        receive data from the vehicle.

2. The system of claim 1, wherein the vehicle is deployed from its respective shipping container.

3. The system of claim 1, wherein the controller is stored in at least one of the plurality of shipping containers.

4. The system of claim 3, wherein the launch and recovery system and the controller are deployed from their respective shipping containers.

5. The system of claim 1, wherein the launch and recovery system can access one or more columns of the plurality of shipping containers using one of a crane, a knuckleboom, or an A-frame.

6. The system of claim 1, wherein the plurality of shipping containers are stacked into layers on the vessel, and wherein the vehicle is stored in one of the plurality of shipping containers on a second or higher layer.

7. The system of claim 1, wherein the plurality of shipping containers are aligned end-to-end to form a corridor, and wherein the launch and recovery system is located at the outlet of the corridor.

8. The system of claim 1 further comprising a modular power generation unit and a modular processing and data center.

9. The system of claim 1, wherein the vehicle is one of the group of: an autonomous underwater vehicle (AUV), a remotely operated vehicle (ROV), a buoy, a seaplane, an unmanned aerial vehicle (UAV), an autonomous surface vessel, a towed sled, a towed array, and an exploratory robot.

10. The system of claim 1, wherein the vessel is one of an oil services vessel, an oil supply vessel, or a fishing boat.

11. The system of claim 1,
    wherein the vessel further includes at least one additional launch and recovery system,
    wherein the shipping containers are aligned end-to-end into a plurality of corridors, and
    wherein the plurality of corridors outnumber the at least one additional launch and recovery system.

12. The system of claim 1, wherein the vessel further comprises a transportation system for moving the vehicle around the vessel.

13. The system of claim 12, wherein the transportation system is configured to move the vehicle through a corridor of shipping containers.

14. The system of claim 12, wherein the transportation system comprises at least one of:
a rail system, a roller system, a horizontal shuffling system, and a cart system.

15. The system of claim 1 further comprising a database for storing received data from the vehicle.

16. A method for deploying a vehicle from a vessel, comprising:
storing a vehicle in one of a plurality of shipping containers;
storing a launch and recovery system in one of the plurality of shipping containers;
arranging the plurality of shipping containers on a vessel;
retrieving the vehicle from the one of the plurality of shipping containers; and
deploying the vehicle from the vessel to a body of water using the launch and recovery system.

17. The method of claim 16, wherein the vehicle is deployed from its respective shipping container.

18. The method of claim 17, wherein the launch and recovery system is deployed from one of the plurality of shipping containers.

19. The method of claim 16, wherein the launch and recovery system can access one or more columns of the plurality of shipping containers using one of a crane, a knuckleboom, or an A-frame.

20. The method of claim 16, wherein the plurality of shipping containers are stacked into layers on the vessel, and wherein the vehicle is stored in one of the plurality of shipping containers on a second or higher layer.

21. The method of claim 16, wherein the plurality of shipping containers are aligned end-to-end to form a corridor, and wherein the launch and recovery system is located at the outlet of the corridor.

22. The method of claim 16, further comprising:
providing power to the vehicle or vessel using a modular power generation unit; and
processing data received from the vehicle using a modular processing and data center.

23. The method of claim 16, wherein the vehicle is one of the group of: an autonomous underwater vehicle (AUV), a remotely operated vehicle (ROV), a buoy, a seaplane, an unmanned aerial vehicle (UAV), an autonomous surface vessel, a towed sled, a towed array, and an exploratory robot.

24. The method of claim 16, wherein the vessel is one of an oil services vessel, an oil supply vessel, or a fishing boat.

25. The method of claim 16, wherein deploying is in response to instructions from a controller.

26. The method of claim 16 further comprising delivering the plurality of shipping containers to the vessel using at least one from the group of: air cargo plane, rail, train, ship, and truck.

* * * * *